US012773882B2

(12) United States Patent
Iozia et al.

(10) Patent No.: US 12,773,882 B2
(45) Date of Patent: Oct. 27, 2026

(54) TYRE PROVIDED WITH A TEMPORARY IDENTIFICATION LABEL

(71) Applicant: Bridgestone Europe NV/SA, Zaventem (BE)

(72) Inventors: Francesco Iozia, Rome (IT); Maria Cristina Caccami, Rome (IT)

( * ) Notice: Subject to any disclaimer, the term of this patent is extended or adjusted under 35 U.S.C. 154(b) by 6 days.

(21) Appl. No.: 19/120,132

(22) PCT Filed: Oct. 10, 2023

(86) PCT No.: PCT/IB2023/060163
§ 371 (c)(1),
(2) Date: Apr. 10, 2025

(87) PCT Pub. No.: WO2024/079622
PCT Pub. Date: Apr. 18, 2024

(65) Prior Publication Data
US 2025/0353266 A1 Nov. 20, 2025

(30) Foreign Application Priority Data
Oct. 11, 2022 (EP) .................................... 22200744

(51) Int. Cl.
*B60C 19/00* (2006.01)

(52) U.S. Cl.
CPC ........ *B60C 19/00* (2013.01); *B60C 2019/004* (2013.01)

(58) Field of Classification Search
CPC .......................... B60C 19/00; B60C 2019/004
USPC ........................................................... 152/539
See application file for complete search history.

(56) References Cited

FOREIGN PATENT DOCUMENTS

| | | | | | |
|---|---|---|---|---|---|
| JP | 2014038627 | A | | 2/2014 | |
| JP | 2017132292 | A | * | 8/2017 | |
| JP | 2019090959 | A | | 6/2019 | |
| JP | 2020083317 | A | | 6/2020 | |
| JP | 2020106646 | A | | 7/2020 | |
| JP | 2021128656 | A | | 9/2021 | |
| JP | 2022514319 | A | | 2/2022 | |
| KR | 101435409 | B1 | * | 8/2014 | ....... G06K 19/07764 |
| RU | 182706 | U1 | * | 8/2018 | ............... H05K 5/00 |
| WO | 2020/126757 | A1 | | 6/2020 | |
| WO | 2022/049054 | A1 | | 3/2022 | |
| WO | 2022219025 | A1 | | 10/2022 | |

OTHER PUBLICATIONS

Dmitry Anatolyevich Bludov, RU-182706-U1, machine translation. (Year: 2018).*

(Continued)

*Primary Examiner* — Sedef E Paquette
(74) *Attorney, Agent, or Firm* — Patterson Intellectual Property Law, PC

(57) ABSTRACT

A tyre having: a toroidal carcass, which has a central cavity and consists of at least one body ply, which is partially folded onto itself and, hence, laterally has two turn-ups, each having an edge of the body ply resting against an intermediate portion of the body ply; two annular beads, each surrounded by the body ply and having a bead core and a bead filler; and an identification label, which is fixed in a removable manner by gluing, is arranged in the area of an annular bead and supports a temporary RFID device, which can be read from a distance.

15 Claims, 7 Drawing Sheets

(56) References Cited

OTHER PUBLICATIONS

Kim Seong-dae, KR-101435409-B1, machine translation. (Year: 2014).*
Tamura Daisuke, JP-2017132292-A, machine translation. (Year: 2017).*
Japan Patent Office, Japanese Office Action in Application No. JP2025520854, dated Apr. 28, 2026, 4 pages.

* cited by examiner

TYRE PROVIDED WITH A TEMPORARY IDENTIFICATION LABEL

TECHNICAL FIELD

The invention relates to a tyre provided with a temporary identification label (namely, with an identification label that is used only during the handling of the tyre and is eliminated when the tyre is fitted on the corresponding rim).

PRIOR ART

Generally speaking, when tyres need to be handled at the end of a production line (typically in order to load the tyres into the freight container) or in a warehouse, operators use forklifts provided with a pair of forks that lift (at least) a stack of tyres from the bottom (typically, when the stack of tyres is resting on a pallet) or forklifts provided with clamps laterally clamping a stack of tyres.

In recent years, so-called "smart" tyres were developed, which are provided with RFID devices (wherein RFID stands for "Radio Frequency Identification"—typically transponders), which allow items of information, such as the identification, the features and the story of the tyre, to be communicated from a distance.

As a consequence, operators, besides having to move the tyres by means of a forklift, also have to be capable of accessing this information, thus reading, with a suitable reader, the RFID devices associated with the tyres, for example in order to make sure that they are operating on the correct tyres and/or in order to store, in an electronic register, possible changes to the position of the tyres.

The operator handling the forklift is normally provided with a manual reader (namely, a light-weighted reader which can easily be transported); after having loaded the tyres onto the forklift, the operator steps off the forklift and, approaching the tyres with the reader, reads the corresponding RFID devices in order to identify the tyres in a certain manner. However, this operating mode leads to an inefficient and large waste of time, since operators have to step off the forklift (hence, having to turn off the forklift and put the forklift in a safe parking configuration) and, furthermore, they have to place the manual reader close to each single tyre in order to read the corresponding RFID device (namely, known manual readers are not capable of simultaneously reading the RFID devices of all the tyres of a stack of tyres, but the reader needs to be placed close to each single tyre of the stack).

To this regard, it should be pointed out that the maximum reading distance of a RFID device incorporated in a single tyre often amounts to approximately 1-2 metres and that a stack of tyres has a height that, in case of TBR (Truck and Bus Radial tyres) normally exceeds 3 metres (hence, more than the maximum reading distance); furthermore, when several tyres are close (stacked together), shielding and/or reflection phenomena can occur, which are due to metal parts of the tyres and further reduce the maximum reading distance of the RFID devices incorporated in the tyres.

In order to ensure the reading of the RFID devices of the tyres, manufacturers suggested applying, in a removable manner and on the outer surface of the tyres (namely, on the tread of the tyres), an identification label, which supports an additional and temporary RFID device (since it is clearly destined to be removed the first time the tyre is fitted on the corresponding rim), which, as it is not shielded by the tyres (it is arranged on the outside), can be read from a definitely greater distance compared to RFID devices incorporated in the structure of the tyres. However, this solution does not completely solve the problem because, in case of use of a forklift provided with a clamp laterally clamping the stack of tyres, the clamp (clearly made of metal) can cover the additional RFID device, which is applied to the tread, thus completely shielding it, or, in the worst case scenario, the clamp can even destroy the additional RFID device, which is applied to the tread; therefore, at least two identification labels (each supporting an additional and temporary RFID device) need to be applied on the tread and be arranged at approximately 90° relative to one another (in this way, at least one identification label always is free when the stack of tyres is laterally clamped by a clamp). However, this solution doubles costs, since two different identification labels have to be applied on each tyre. Furthermore, according to this solution, each identification label has to face the antenna of the reader (namely, the identification label has to be in "LOS—Line Of Sight" with the antenna of the reader) and, hence, the antenna of the reader needs to be moved all around the stack of tyres in order to read the temporary RFID devices of all the tyres of the stack; indeed, when an identification label is on the opposite side of the tyre relative to the antenna of the reader, all the metal and the "lossy material" of the tyre shield the identification label (or, anyway, jeopardize the performances of the identification label), thus making it difficult, if not impossible, for the corresponding temporary RFID device to be read.

Patent application WO2022219025A1 discloses a tyre provided with an identification label, which is fixed in a removable manner by means of gluing, is arranged in the area of an annular bead and supports a temporary RFID device, which can be read from a distance.

Patent application WO2022049054A1 discloses a method for the management of a warehouse that houses tyres fitted with transponders and arranged in vertical stacks and using an autonomously guided robot for the automatic recognition of the tyres.

Patent application WO2020126757A1 discloses a method for reading and/or writing data from/on RFID of tyres conveyed on a conveyor belt.

DESCRIPTION OF THE INVENTION

The object of the invention is to provide a tyre provided with a temporary identification label, said tyre not being affected by the drawbacks described above and, at the same time, being easy and economic to be manufactured.

According to the invention, there is provided a tyre provided with a temporary identification label according to the appended claims.

According to the invention, there are also provided a logistics system to handle a tyre warehouse and a method to handle a tyre warehouse as set forth in the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
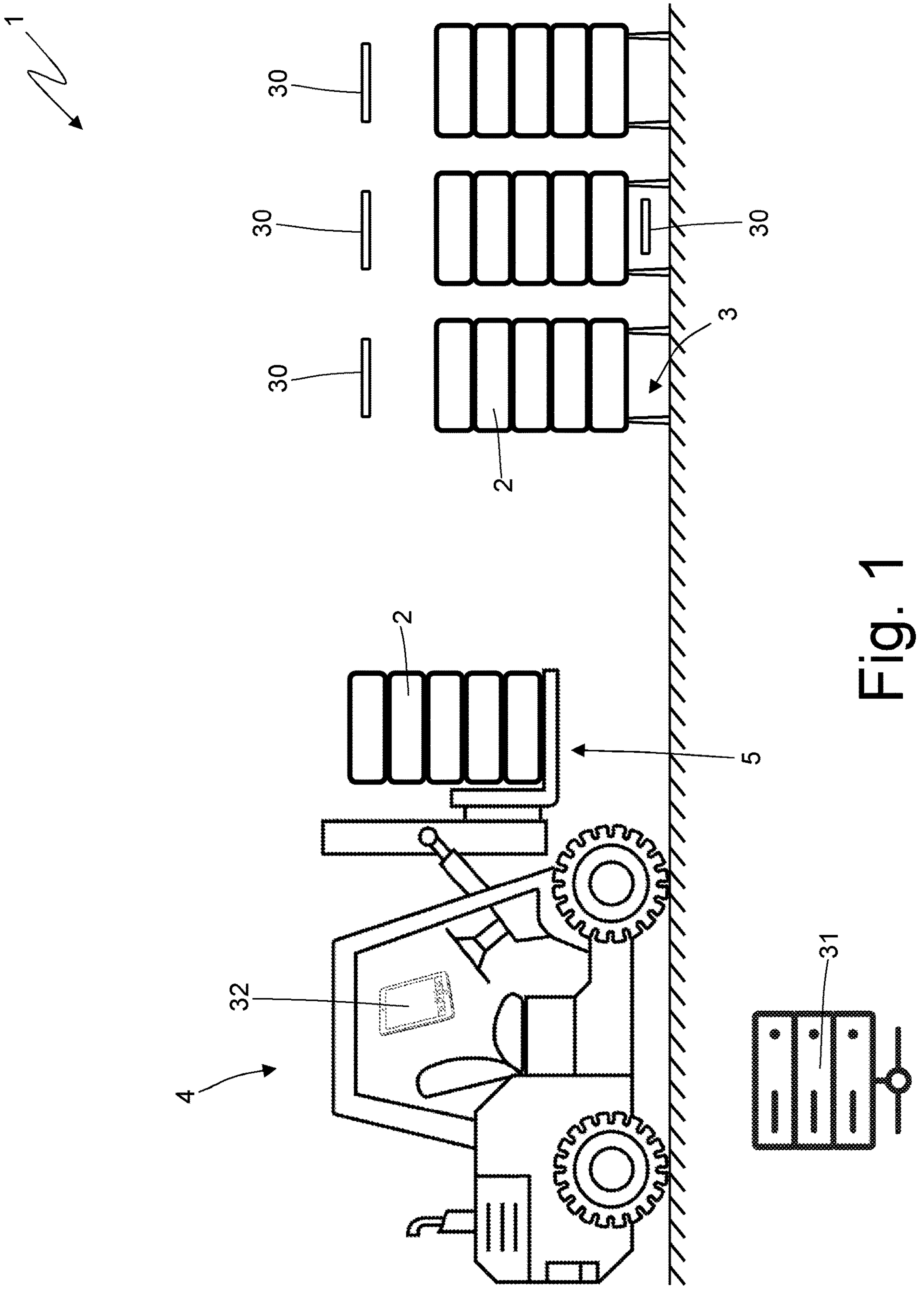
FIG. 1 is a schematic view of a warehouse for tyres that have to be loaded into a container or truck in order to be delivered to customers and are each provided with a temporary identification label.

In FIG. 1, number 1 indicates, as a whole, a warehouse for tyres 2, which have to be loaded into a container or truck in order to be delivered to customers.

Inside the warehouse 1 there are a plurality of support elements 3, each designed to support a vertically oriented stack of tyres 2 at a given distance from the ground (i.e. from the floor of the warehouse 1); in other words, the support elements 3 are shelves or racks, which support the stack of tyres 2 keeping them lifted from the ground. It should be pointed out that a stack of tyres 2 can be oriented vertically (as shown, for example, in FIG. 1) or can be oriented horizontally (as shown, for example, in FIG. 6, 7 or 8); in a vertically oriented stack of tyres 2, the tyres 2 are placed on top of one another, thus increasing the height of the stack, whereas, in a horizontally oriented stack of tyres 2, the tyres 2 are place next to one another, thus increasing the length of the stack. Obviously, in the same warehouse 1 there can be vertically oriented stacks of tyres 2 as well as horizontally oriented stacks of tyres 2.

A series of forklifts 4 operate inside the warehouse 1, namely they move the stack of tyres 2 and, in particular, place the stack of tyres 2 coming from the production lines on the support elements 3 as well as retrieve the stack of tyres 2 from the support elements 3 in order to insert the stack of tyres 2 into containers or trucks.

Each forklift 4 is an operating means provided with wheels, which is operated by an electric motor, a Diesel engine or a gas engine and comprises a holding device 5, which is arranged at the front and is designed to pick up a stack of tyres 2. In the embodiment shown in the accompanying figures, the holding device 5 consists of a pair of forks (only one of them being visible in the accompanying figures), which lift the stack of tyres 2 from the bottom; according to a different embodiment which is not shown herein, the holding device 5 consists of a clamp, which laterally clamps the stack of tyres 2.

Figure 2:
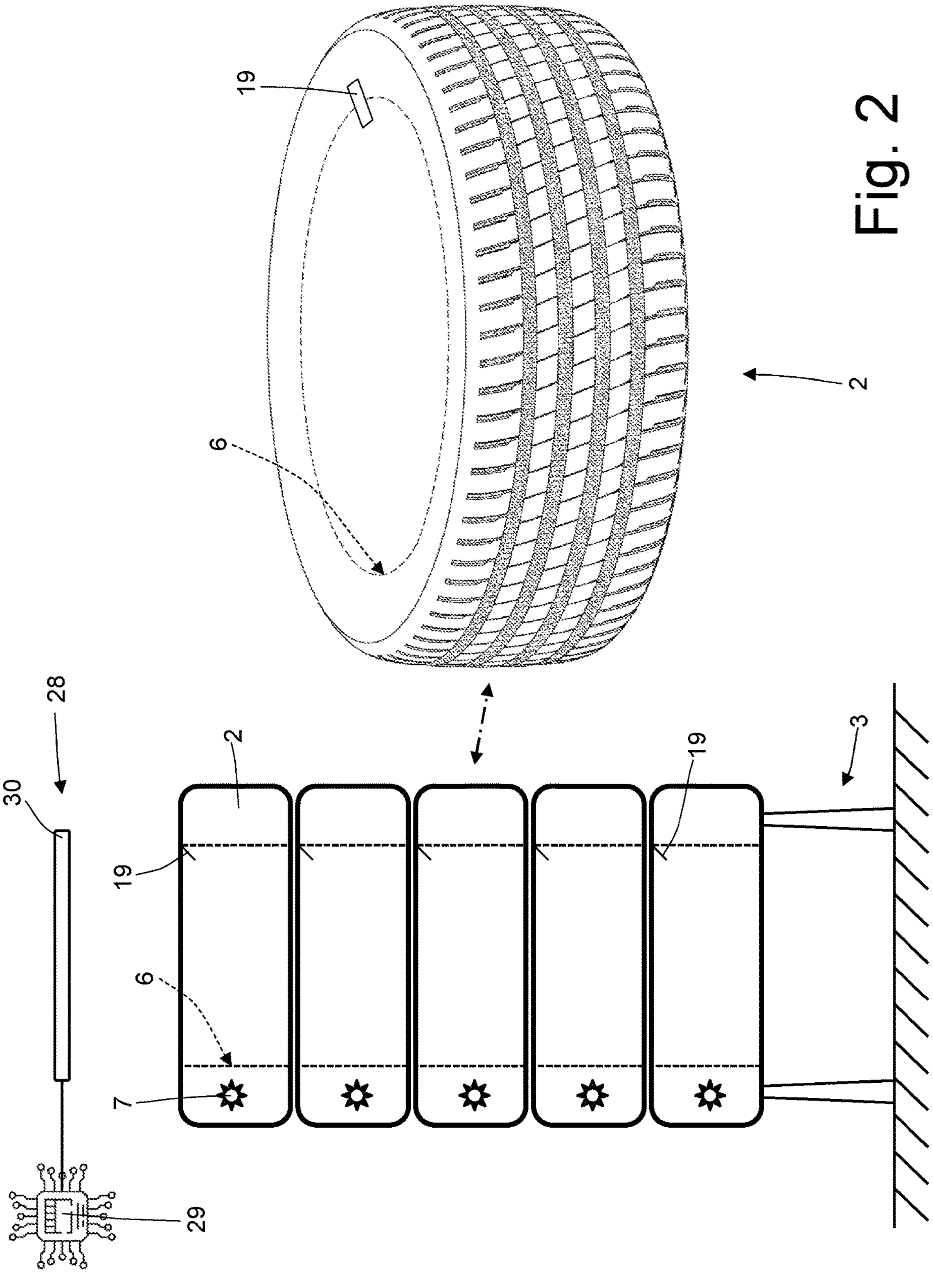
FIG. 2 is a schematic view of a stack of tyres standing in the warehouse of FIG. 1.
Figure 3:
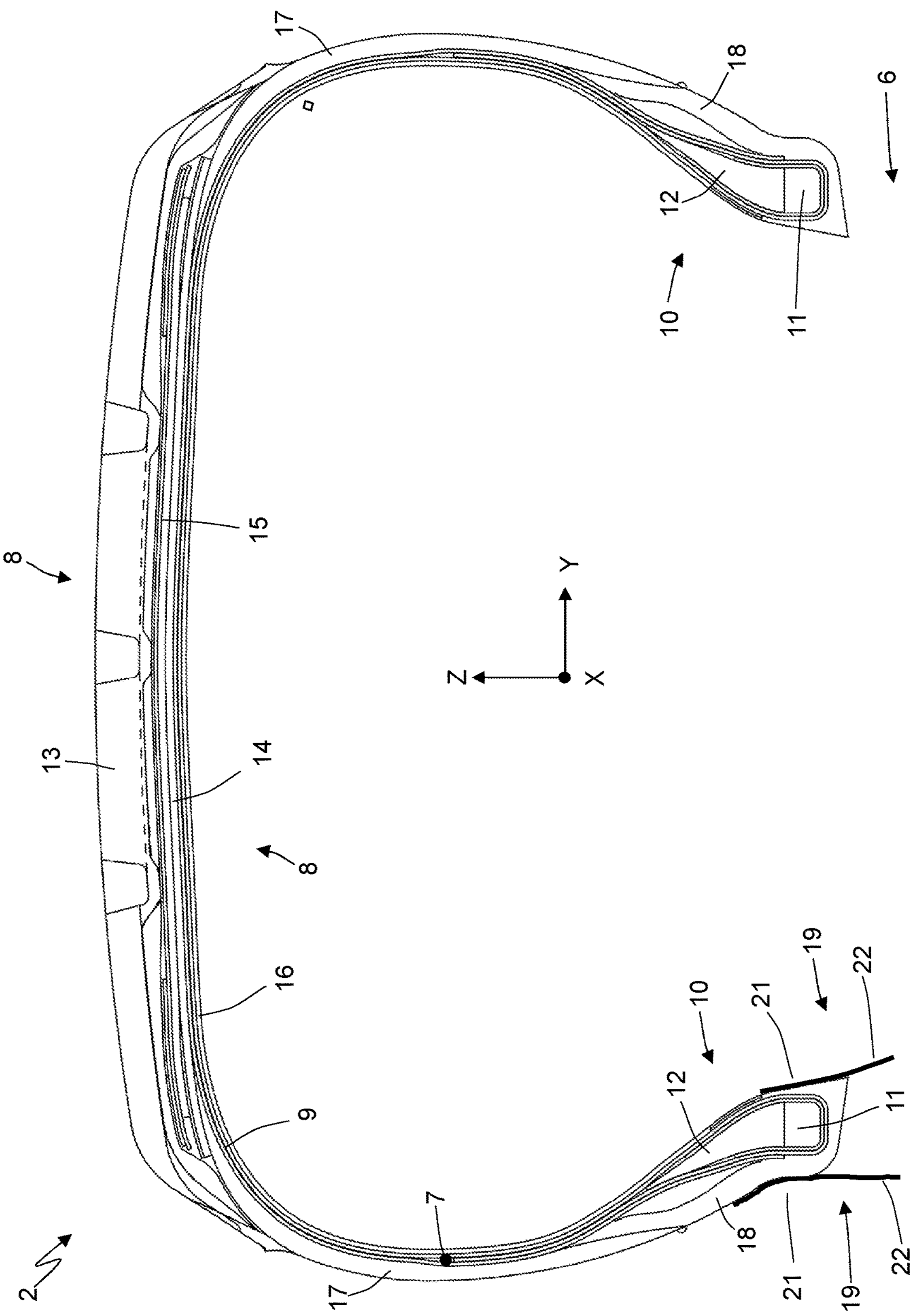
FIG. 3 is a schematic cross section, with parts removed for greater clarity, of a tyre available in the warehouse of FIG. 1.

According to FIGS. 2 and 3, each tyre 2 has an annular shape having a central cavity 6.

According to FIG. 3, each tyre 2 comprises a toroidal carcass 8, which consists of a body ply 9, which is partially folded onto itself f and, therefore, has two "turn-ups" (namely, two overlapping layers) on the sides. In each turn-up of the body ply 9, an edge (namely, a final end) of the body ply 9 rests against an intermediate portion of the body ply 9.

On the opposite sides of the carcass 8 there are two annular beads 10, each surrounded by the body ply 9 (namely, surrounded by the turn-ups of the body ply 9) and having a bead core 11, which is reinforced with a number of metal wire loops, and a bead filler 12; in other words, the bead core 11 consist of steel wires embedded in rubber and ensures a perfect coupling between the tyre 2 and the rim. As a consequence, each bead core 11 is basically made up of metal material, namely it mainly is a metal object covered by a relatively thin rubber layer.

The carcass 8 supports an annular tread 13; between the carcass 8 and the tread 13, a tread belt 14 is interposed, which comprises two tread plies 15. Each tread ply 15 comprises a number of metal cords (not shown), which are embedded within a rubber belt, are arranged alongside one another with a given pitch and form an angle of inclination determined in relation to an equatorial plane of the tyre 2.

Inside of the body ply 9 there is an innerliner 16, which is impermeable to air, constitutes an inner coating and has the function of holding air inside the tyre 2 in order to preserve the inflation pressure of the tyre 2 over time.

The body ply 9 supports a pair of sidewalls 17, which are arranged on the outside of the body ply 9 between the tread 13 and the beads 10.

Finally, the body ply 9 supports a pair of abrasion gum strips 18, which are arranged on the outside radially inside the sidewalls 17 and in the area of the beads 10.

Figure 4:
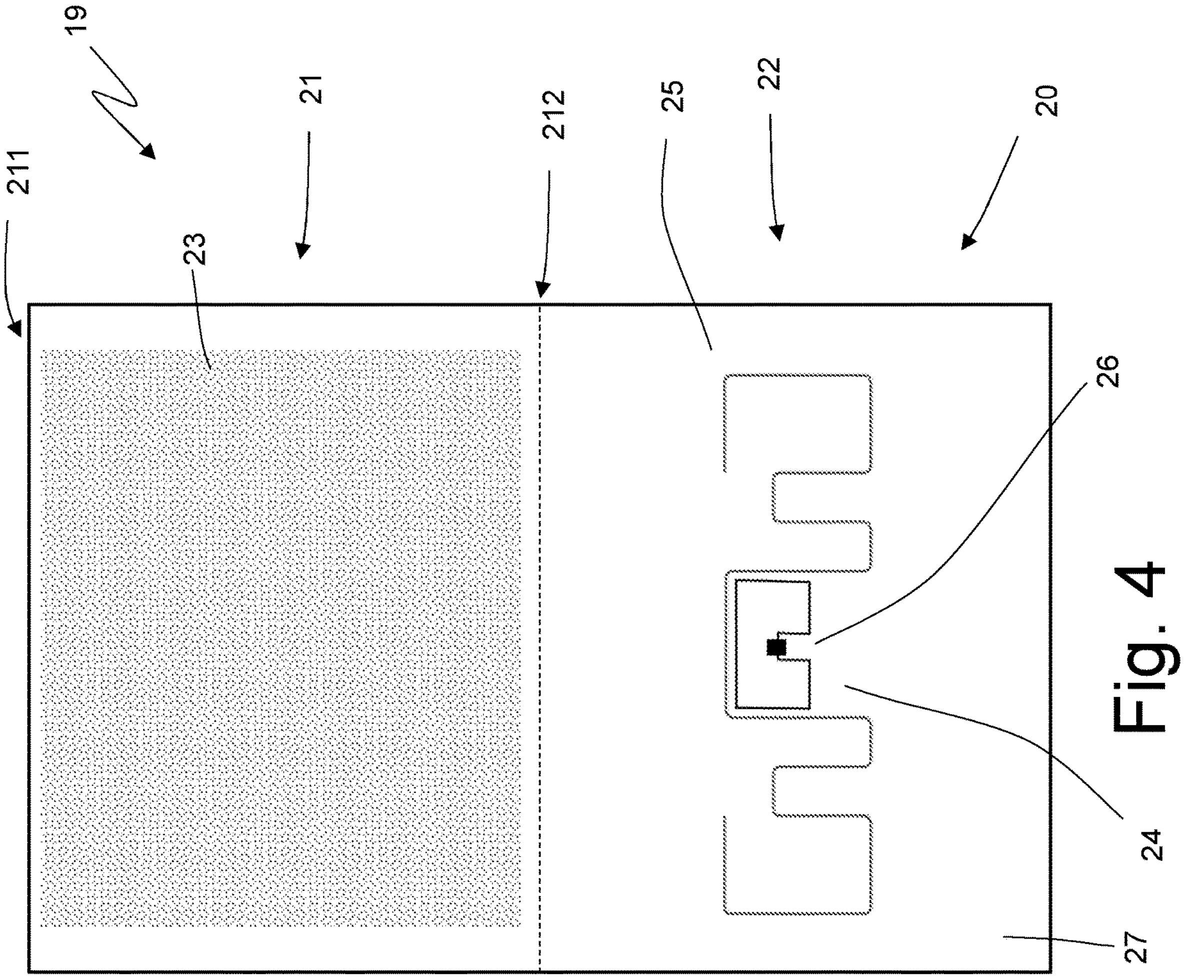

According to FIGS. 2 and 3, each tyre 2 is also provided with (at least) an identification label 19, which is attached in a removable manner to a peripheral surface of said tyre, preferably by means of gluing or of an adhesive and supports a temporary RFID device 20 which can be read from a distance (shown in FIG. 4).

According to a preferred embodiment, each temporary RFID device 20 can store the so-called "Unique Item Identifier-UII" for applications in the tyre industry in accordance with the ISO 20910 standards and coded with a "SGTIN-96" coding ("96 bits—Serialized Global Trade Item Number") according to the "GS1 EPC Tag Data" standard.

It should be pointed out that, in each tyre 2, the temporary RFID device 20 is only used inside the warehouse 1 and, if necessary, during the transportation of the tyre 2 to the end user, but it is normally removed from the tyre 2 (and, hence, thrown away) before fitting the tyre 2 on the rim. The temporary RFID device 20 is used because it can (much) more easily be read when the tyre 2 is in a stack (as discussed below) compared to a permanent RFID embedded inside the tyre (shown in FIGS. 2 and 3 with the numeral 7). The temporary RFID device 20 always contains the information that allows the tyre 2 to be identified (for example, its serial number); in particular, the temporary RFID device 20 contains the so-called "Unique Item Identifier—UII".

In each tyre 2, the identification label 19 (supporting the temporary RFID device 20) is arranged in the area of an annular bead 10 and, in particular, radially overlaps the bead core 11.

Preferably the identification label 19 radially overlaps the bead core 11 and radially extends past the bead core 11 at least in the radially inner direction.

FIG. 3 shows two different (and perfectly equivalent) positions of the identification label 19 in a tyre 2: the identification label 19 can be attached to an axially outer side of the peripheral surface of the tyre, like on the abrasion gum strip 18, or on the sidewall 17 or the identification label 19 can be attached to an axially inner side of the peripheral surface of the tyre 2, like on the innerliner 16 or on the axially inner portion of the abrasion gum strip 18 radially inside the end of the innerliner 16; FIG. 3 shows two identification labels 19 in the two different positions, but, obviously, in reality there is one single identification label 19.

Preferably the identification label 19 is attached to the tyre (2) on a perimetral surface located axially outside the bead core 11.

Preferably the identification label 19 is attached to the tyre (2) on a perimetral surface located axially inside the bead core 11.

Figure 5:
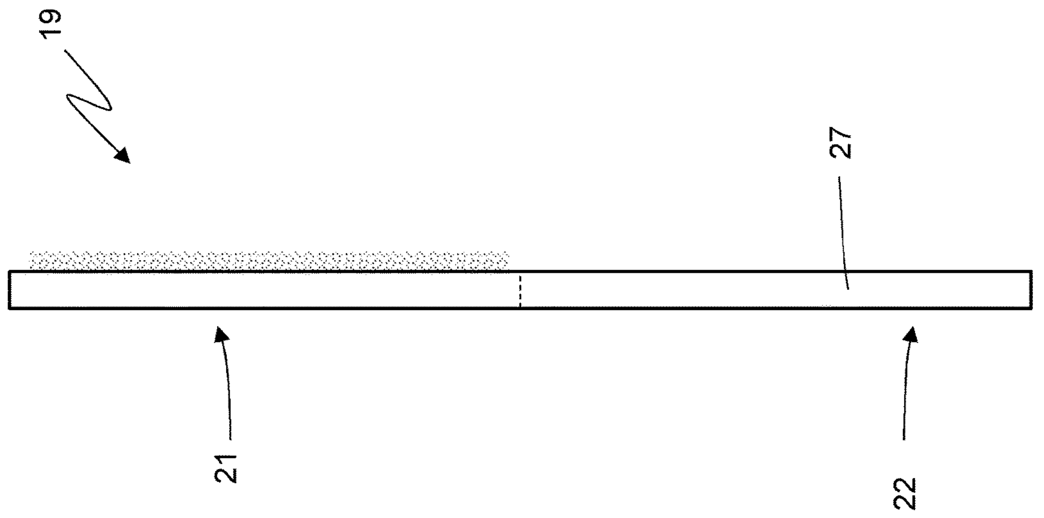
FIGS. 4 and 5 are two schematic views, a front view and a lateral view respectively, of a temporary identification label suitable for being fixed to a tyre available in the warehouse of FIG. 1.

According to FIGS. 3, 4 and 5, each identification label 19 has an outer portion 21 (namely, radially arranged more on the outside), which is attached (glued or by means of an adhesive) to the tyre 2 in the area of an annular bead 10, and a radially inner portion 22, connected to the outer portion 1 which projects in a free manner, without being attached to the tyre 2 in the area of an annular bead 10.

The radially outer portion 21 of each identification label 19 has a radially outer end 211 and a radially inner end 212; the radially inner portion 22 is connected to the radially inner end 212 of the outer portion 21.

Preferably the radial distance between the radially outer end 211 and the radially inner end 212 of the outer portion 21 of the identification label 19 is in the range of 85 to 15 mm, preferably in the range of 55 to 35 mm, more preferably in the range of 50 to 25 mm and even more preferably about 45 mm.

The radially inner portion 22 of the identification label 19 projects like a flag, from a radially innermost annular edge of the area of an annular bead 10 of the tyre 2 towards a centre of the central cavity 6.

In each identification label 19, the outer portion 21 of the identification label 19 has a connection surface 23, which is attached (in particular glued by means of a glue) to the peripheral surface of the tyre 2.

Preferably the outer portion 21 is attached to the tyre 2 in the area radially outside the bead core 11.

Preferably the outer portion 21 is attached to the tyre 2 in the area radially overlapping the abrasion gum strip 18.

Preferably the outer portion 21 is attached to the tyre 2 in the area radially overlapping the sidewall 17.

Preferably the outer portion 21 is attached to the tyre 2 in the area radially overlapping the sidewall 17 and the abrasion gum strip 18.

Preferably the outer portion 21 is attached to the tyre 2 in an area of the peripheral surface of the tyre 2 having the smallest curvature.

In each identification label 19, the inner portion 22 of the identification label 19 is completely free and hanging in the air, namely all the surfaces of the inner portion 22 are in the air and do not touch any part of the tyre 2.

Each identification label 19 is attached (glued) to a peripheral surface of a tyre 2 by means of a glue or adhesive, which allows the identification label 19 to be subsequently removed in a relatively simple manner; for example, it is possible to use a non-drying re-stick glue or adhesive 23, which, hence, allows the identification label 19 to be relatively easily removed from the outer surface of the corresponding tyre 2.

The terms "radial", "radially" or "axial", "axially" and their derivates used herein and hereafter should have the common meaning understood in the tyre industry and are according to the reference given in FIG. 3, wherein the radial direction is along the Z-axis, the axial direction is along the Y-axis and the circumferential direction is along the X-axis.

The terms "outer" or "inner" in combination to the radial and axial directions can be clearly identified by the following example with reference to FIG. 3: The tread 13 is positioned radially outside the bead core 11, wherein in the sidewall area, the innerliner 16 is positioned axially inside the sidewall 17.

According to a preferred embodiment shown in FIG. 4, the identification label 19 comprises a radially outer portion 21 with a radially outer end 211 and a radially inner end 212 and a radially inner portion 22, connected to the radially inner end 212 of the outer portion 22.

The identification label 19 comprises a temporary RFID device 20. The temporary RFID device 20 is arranged only and exclusively on the radially inner portion 22 of said identification label 19 so that the RFID device 20 is not present at all in the radially outer portion 21.

The temporary RFID device 20 comprises an antenna and said antenna is arranged only in the inner portion 22 without extending to the outer portion 21.

In a preferred embodiment shown in FIG. 4 the antenna comprises a first antenna element 24 and a second antenna element 25.

Both the first antenna element 24 and the second antenna element 25 are arranged only in the inner portion 22 without extending to the outer portion 21.

The temporary RFID device 20 comprises a microchip 26.

The microchip 26 is electrically connected to the antenna.

The microchip 26 is electrically connected to the first antenna element 24.

The first antenna element 24 is electromagnetically connected to the second antenna element 25.

The outer portion 21 of the identification label 19 has a connection surface 23 suitable for being attached (in particular glued by means of a glue or fixed by means of adhesives) to the peripheral surface of the tyre 2.

Furthermore, the microchip 26 (namely, a miniaturized electronic circuit) is provided with a non-volatile memory (typically, an EEPROM or FRAM memory, the latter being more expensive, but more technologically advanced).

The microchip 26 can be provided with an automatic tuning mechanism, which is capable of automatically adjusting its inner impedance in order to optimize and improve readability performances, thus allowing for a greater tolerance in the production and in the positioning of the identification labels 19.

Each identification label 19 comprises a support 27, on which the temporary RFID device 20 is housed and which typically consists of a thin sheet of Mylar, plastic such as PET or PVC or other similar materials.

According to a preferred embodiment shown in FIG. 2, reader devices 28, each comprising an electronic control unit 29 and an antenna 30, are arranged in the warehouse 1 in a fixed position. Each antenna 30 works so as to radiate/receive RF signals having frequencies in a "UHF—Ultra High Frequency" band, preferably within a range of frequencies ranging from 860 to 960 MHZ, more preferably within a sub-range of frequencies ranging from 865 to 868 MHz and/or within a sub-range of frequencies ranging from 902 to 928 MHz. Furthermore, the optional requirements of each antenna 30 can conveniently include a gain exceeding 0 dB and circular polarization.

Figure 8:
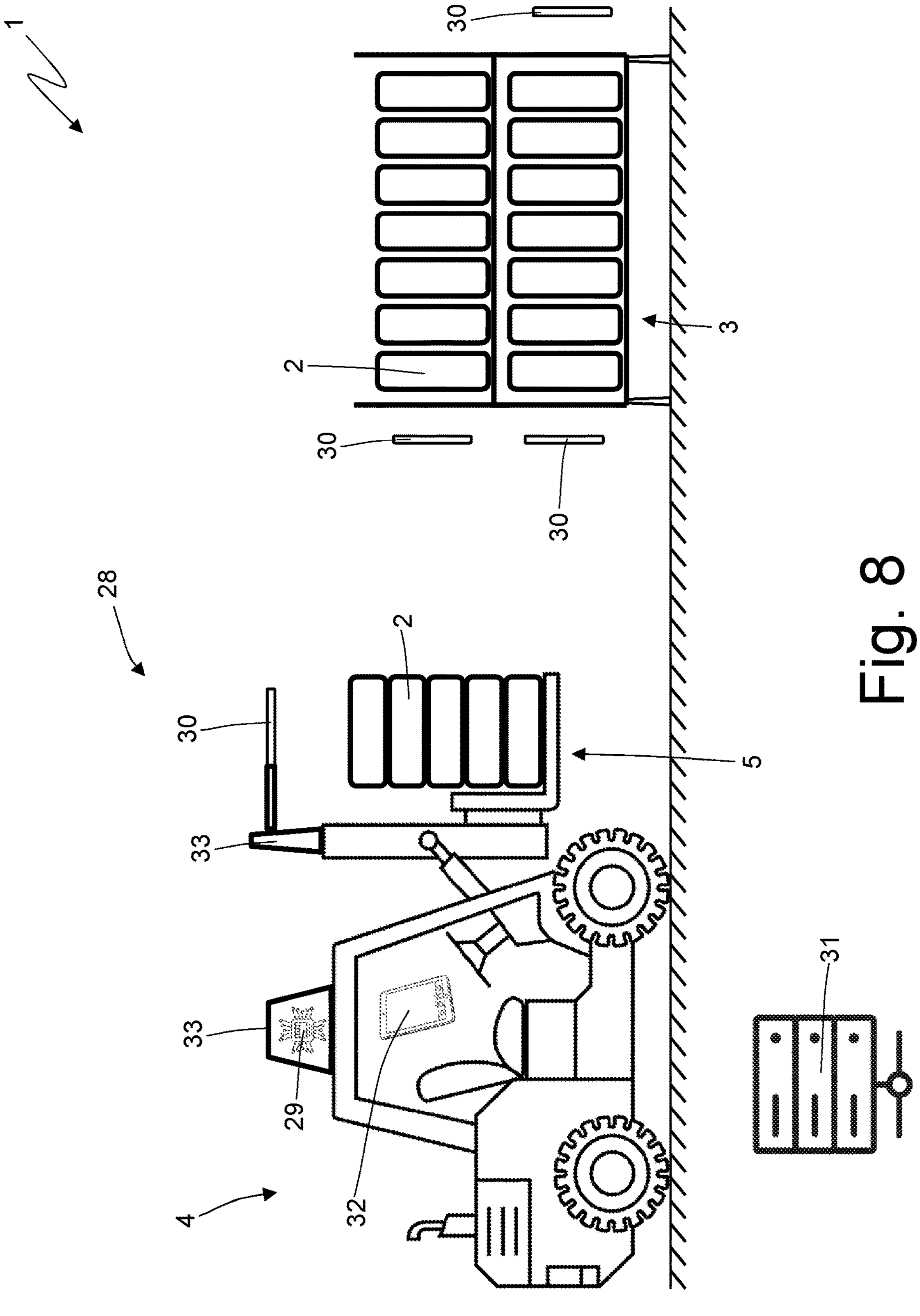

According to FIG. 1, some antennas 30 are horizontally arranged at a given height (greater than the maximum height of stack of tyres 2) so as to read the temporary RFID devices 20 of the tyres 2 of the vertical stacks. According to FIG. 6 or to FIG. 8, some antennas 30 are vertically arranged in positions deemed to be suitable to read the temporary RFID devices 20 of the tyres 2 of the horizontal stacks; for example, one or two antennas 30 can be arranged on the sides of a door/gate through which the support elements 3 supporting at least one horizontally arranged stack of tyres 2 are caused to pass. Generally speaking, a horizontal antenna 30 can read the temporary RFID devices 20 of the tyres 2 of the vertical stacks (as shown in FIG. 8) or a vertical antenna 30 can read the temporary RFID devices 20 of the tyres 2 of the horizontal stacks. Indeed, in order to effectively read the temporary RFID devices 20 of the tyres 2 of a stack, the antenna 30 must face the central cavities 6 of the stacked tyres 2 so as to "see" all the corresponding temporary RFID devices 20 located in the central cavities 6; as a consequence, in order to "see" all the temporary RFID devices 20 of the tyres 2 of a vertical stack of tyres 2, the antenna 30 must be oriented horizontally and must be located above or under the stack, whereas, in order to "see" all the temporary RFID devices 20 of the tyres 2 of a horizontal stack of tyres 2, the antenna 30 must be oriented vertically and must be located on the side of the stack.

In other words, each stack of tyres 2 to be identified is placed close to the antenna 30 of the reader device 28, in particular under the antenna 30 or next to the antenna 30, so that the antenna 30 faces and is aligned with a central cavity 6 of the tyres 2 making up the stack.

According to a preferred embodiment, one single antenna 30 is sufficient to read all the temporary RFID devices 20 of the tyres 2 of a stack of tyres 2, namely said single antenna 30 is arranged at one single end (above, under or beside) of the stack; alternatively and for greater certainty (confidence) two antennas 30 can be used to read all the temporary RFID devices 20 of the tyres 2 of a stack of tyres 2, namely the two antennas 30 are arranged opposite one another at the two ends (above, under or beside) of the stack.

However, it should be pointed out that, theoretically speaking, an antenna 30, regardless of its orientation, could anyway read the temporary RFID devices 20 of the tyres 2 of stacks that are arranged both vertically and horizontally.

In use, a stack of tyres 2 to be identified is placed in the reading field of an antenna 30 (namely, under the antenna 30 or beside the antenna 30) of a reader device 28 so as to allow the reader device 28 to read the temporary RFID devices 20 of all the tyres 2; in particular, a stack of tyres 2 (generally carried by the holding device 5 of a forklift 4) can briefly be stopped in the area of an antenna 30 of a reader device 28 or can be caused to slowly move forward in the area of the antenna 30 of a reader device 28. If, besides reading the temporary RFID devices 20 of all the tyres 2, the reader device 28 happened to also read one or more permanent RFID devices 7, the reading of the permanent RFID devices 7 would simply be redundant relative to the reading of the temporary RFID devices 20 and could be ignored as a "double" without causing any kind of problem. In particular, according to the "RFID EPC Gen2 GS1" protocol, when two RFID devices 7 and 20 with the same name and, hence, without univocal EPCs are read, one single RFID device 7 or 20 present in the reading field is signalled following the interrogation of the reader device 28.

Owing to the above, the warehouse 1 is evidently provided with a logistics system, which allows the handling of the tyres 2 to be managed in a highly automated manner thanks to an autonomous reading (namely, without the manual intervention of an operator) of the temporary RFID devices 20 coupled to the tyres 2. In particular, the reader devices 28 are connected to a control server 31 of the warehouse 1 (schematically shown in FIG. 1); the control server 31 is also connected to a tablet computer 32 (or to a similar portable device), which is used by an operator of a forklift 4. Through the tablet computer 32, an operator of a forklift 4 receives operating indications from the control server 31 and communicates the execution of the tasks assigned to the control server 31 so as to update in real time the state of the warehouse 1, namely of the tyres 2 stored and retrieved and currently present in the warehouse 1. In other words, the control server 31 runs a management software, which handles the communication between the reader devices 28 and human operators (some of them driving the forklifts 4).

According to a possible (though, non-binding embodiment, in order to allow the operator of a forklift 4 to quickly and confidently make sure that a reader device 28 has read all the temporary RFID devices 20 of the tyres 2 making up a stack carried by the holding device 5 (a stack of TBR truck tyres 2 generally consists of five to eight TBR tyres 2 on top of one another or next to one another, depending on the size of the tyres 2), the operator, each time, has to enter (type in) the number of tyres 2 loaded on the holding device 5 using the tablet computer 32 (the software installed in the tablet computer 32 could already suggest to the operator a predefined limited selection of numbers of tyres 2 loaded on the holding device 5); the software installed in the tablet computer 32 checks whether the number of temporary RFID devices 20 read by the reader device 28 corresponds to (namely, is the same as) the number of tyres 2 loaded on the holding device 5 of the forklift 4 (provided by the operator): in case the numbers are the same, the software provides a positive signal (for example, by means of a green light) and the reading operation undergone by the temporary RFID devices 20 is concluded, whereas, in case the numbers are not the same, the software provides a negative signal (for example, by means of a red light and an acoustic warning) and the reading operation undergone by the temporary RFID devices 20 must be repeated.

It should be pointed out that a same reader device 28 could comprise several antennas 30 arranged in different positions (anyway, close to one another) and activated in different instants by the electronic control unit; in this way, a driver of a forklift 4 transporting (at least) a stack of tyres 2 does not have to follow with precision a predetermined set route, but can even (more or less accidentally) deviate from the predetermined set route, as the plurality of antennas 30 allow the operator to cover a relatively large area around the predetermined set route.

Figure 6:
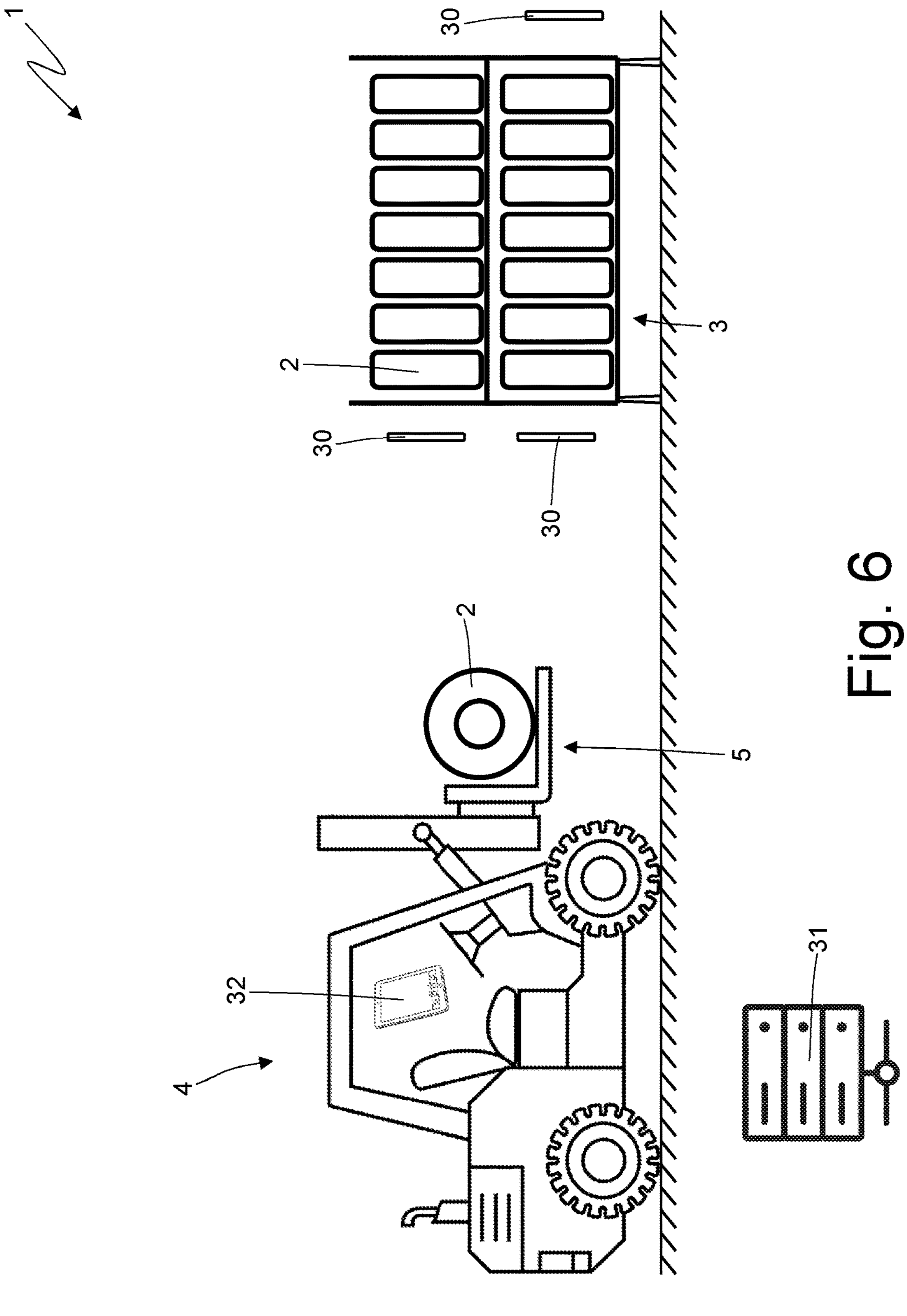
FIG. 6 is a schematic view of the warehouse of FIG. 1 highlighting the stacks of tyres oriented horizontally instead of vertically like in FIG. 1.
Figure 7:
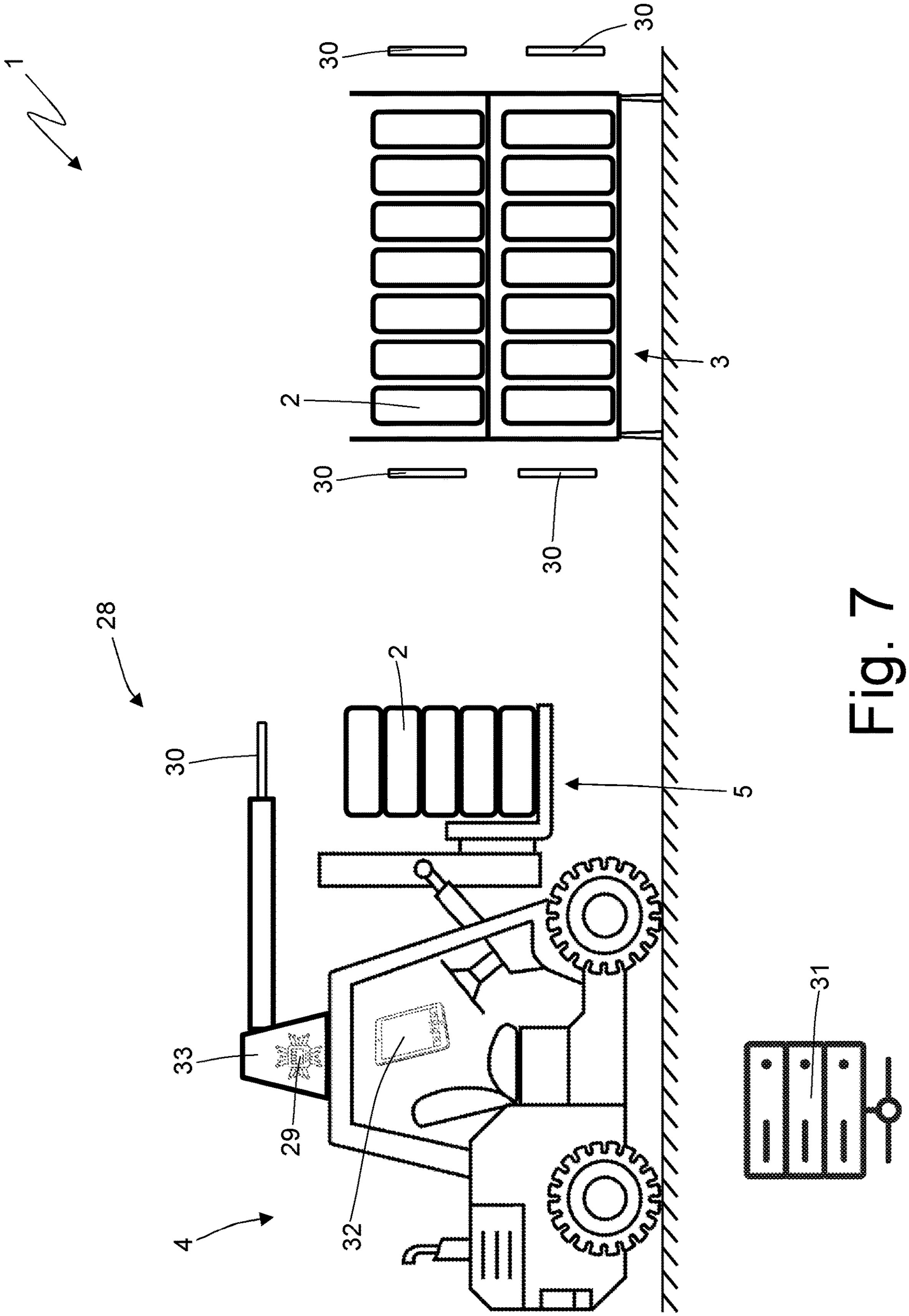
FIGS. 7 and 8 are schematic views of the warehouse of FIG. 1 with respective variants of a forklift.

In the embodiment shown in FIGS. 1, 2 and 6, the antennas 30 of the reader devices 28 are arranged in a fixed position inside the warehouse 1, namely the antennas 30 of the reader devices 28 are mounted on fixed structures of the warehouse 1. In the variant shown in FIGS. 7 and 8, at least one reader device 28 is installed on board a forklift 4; in particular, the forklift 4 comprises a support device 33 (for example, mounted on the roof of the forklift 4), which supports the antenna 30 so as to place the antenna 30 close (typically, though not necessarily, above) the stack of tyres 2 (or the stacks of tyres 2) carried by the holding device 5 of the forklift 4. The support device 33 could also have a telescopic arm to move, only when needed, the antenna 30 close (typically, though not necessarily, above) the stack of tyres 2 (or the stacks of tyres 2) carried by the holding device of the forklift 4. The antenna 30 (or the antennas 30) of the reader device 28 installed on board a forklift 4 could also be mounted on a frame of the holding device 5.

The embodiments described herein can be combined with one another, without for this reason going beyond the scope of protection of the invention.

The tyre 2 described above has numerous advantages.

First of all, the tyre 2 described above allows for an efficient (quick) and effective (confident) identification of all the tyres 2 making up a stack by means of a reader device 28 provided with one single antenna 30 arranged in a fixed position (hence, by means of a simple, economic and simple-to-use reader device 28). This result is obtained thanks to the particular positioning of the identification labels 19, which allows them to always be read in a confident manner, even when the tyres 2 are stacked; indeed, the central cavities 6 of the tyres 2 (where the identification labels 19 are located) are always free from electromagnetic shielding (due to the Faraday cages created by the metal elements of the tyres 2) even when the stacked tyres 2 are handled.

Furthermore, the particular conformation of the identification labels 19 and the resulting positioning of the temporary RFID devices 20 allows the usable reading distance of the temporary RFID devices 20 to be maximized, since the positioning "in the air" of the radially inner portion 22 allows the temporary RFID devices to be distant from any metal mass (namely, the bead cores 11) of the tyres 2, which, would be a disturbing element.

Some experiments have shown that a reader device 28 provided with one single antenna 30 oriented horizontally or vertically is capable of reading the temporary RFID devices 20 of all the tyres 2 of a stack up to a distance of 6-8 metres from the tyre 2 of the stack that is the farthest from the antenna 30.

In addition, the positioning of the identification labels 19 inside the tyres 2 (namely, in the area of the central cavity 6 of the tyres 2, projecting towards the inside starting from a bead 10) makes the identification labels 19 extremely protected and, hence, substantially unaffected by damages or unintentional detachments; indeed, the areas of the beads 10 are never touched in any way during the handling thereof.

Finally, the identification labels 19 are inexpensive (and thus represent negligible part of the total manufacturing cost of the tyre), as the temporary RFID devices 20 can have relatively small antenna elements 24 and 25.

Besides, it should be pointed out that for each tyre 2 it is always sufficient to apply one single identification label 19, since even one single identification label 19 is always read from the top, regardless of the orientation of the tyre 2 and of the way in which the stack is held; anyway, it should be pointed out that coupling one single tyre 2 to two or more identification labels 19 is not forbidden (even though it is substantially useless).

The invention finds advantageous application in the handling of so-called TBR ("Truck and Bus Radial") tyres 2, but, anyway, it can be applied to tyres 2 of any type (larger or also smaller than so-called TBR tyres 2).

LIST OF THE REFERENCE NUMBERS OF THE FIGURES

1 warehouse
2 tyres
3 support element
4 forklift
5 holding device
6 central cavity
7 permanent RFID device
8 carcass
9 body ply
10 beads
11 bead core
12 bead filler
13 tread
14 tread belt
15 tread ply
16 innerliner
17 sidewalls
18 abrasion gum strip
19 identification label
20 temporary RFID device
21 inner portion
22 outer portion
23 connection surface
24 first antenna element
25 second antenna element
26 microchip
27 support
28 reader device
29 electronic control unit
30 antenna
31 control server
32 tablet computer
33 support device

The invention claimed is:

1. A tyre comprising:

a toroidal carcass having a central cavity;

two annular beads, each having at least one bead core; and an identification label, which is attached in a removable manner to a peripheral surface located axially outside the bead core of said tyre, and supports a temporary RFID device, which can be read from a distance;

wherein said identification label is arranged in an area of an annular bead; and wherein said identification label has a radially outer portion attached to the tyre and with a radially outer end and a radially inner end, and a radially inner portion, which projects from the tyre in a free manner without being attached to the tyre and is connected to the radially inner end of the radially outer portion;

wherein the temporary RFID device is arranged only and exclusively on the radially inner portion of said identification label so that the temporary RFID device is not present at all in the radially outer portion.

2. The tyre according to claim 1, wherein the radially inner portion projects from a radially innermost annular edge of the area of the annular bead of the tyre towards a centre of the central cavity.

3. The tyre according to claim 1, wherein the radial distance between the radially outer end and the radially inner end of the radially outer portion of the identification label is in the range of 85 to 15 mm.

4. The tyre according to claim 1, wherein the radially outer portion of the identification label has a connection surface, which is attached to the tyre in an area of the bead core.

5. The tyre according to claim 4, wherein the radially inner portion of the identification label has no connection surface, is not glued to the area of an annular bead and is completely free.

6. The tyre according to claim 1, wherein said temporary RFID device comprises an antenna and said antenna is arranged only on the radially inner portion without extending to the radially outer portion.

7. The tyre according to claim 6, wherein:

the antenna comprises a first antenna element and a second antenna element; and said first antenna element is electromagnetically connected to said second antenna element.

8. The tyre according to claim 1, wherein the identification label is attached to the peripheral surface located axially outside the bead core of the tyre by means of gluing or of an adhesive.

9. The tyre according to claim 1, wherein a radial distance between the radially outer end and the radially inner end of the radially outer portion of the identification label is in the range of 55 to 35 mm.

10. A warehouse for tyres comprising a plurality of tyres each of which is according to claim 1 and is provided with the identification label;

wherein the tyres are arranged in stacks.

11. The warehouse according to claim 10 and comprising:

a reader device, which is designed to read each temporary RFID device from a distance and comprises at least one antenna; and a handling device configured to place a stack of tyres to be identified close to the at least one antenna of the reader device so that the at least one antenna faces and is aligned with a central cavity of the tyres making up the stack.

12. The warehouse according to claim 11, wherein the reader device comprises a plurality of antennas, which are alternatively activated to increase an area covered by the reading.

13. A method to handle a warehouse for tyres according to claim 1 and comprising the steps of:

applying the identification label to each tyre; and stacking the tyres in stacks.

14. The handling method according to claim 13 and comprising the further steps of:

installing a reader device, which is designed to read each temporary RFID device from a distance and comprises at least one antenna; and placing a stack of tyres to be identified close to the at least one antenna of the reader device so that the at least one antenna faces and is aligned with a central cavity of the tyres making up the stack.

15. The handling method according to claim 14, wherein the reader device comprises a plurality of antennas, which are alternatively activated to increase an area covered by the reading.

* * * * *